United States Patent [19]

Meister

[11] Patent Number: 5,608,270

[45] Date of Patent: *Mar. 4, 1997

[54] VEHICLE SAFETY RESTRAINT SYSTEM WITH LINEAR OUTPUT IMPACT SENSOR

[76] Inventor: Jack B. Meister, 68 Chimney Ridge Rd., P.O. Box 216, Convent Station, N.J. 07916

[*] Notice: The term of this patent shall not extend beyond the expiration date of Pat. No. 5,430,334.

[21] Appl. No.: 423,323

[22] Filed: Apr. 17, 1995

Related U.S. Application Data

[63] Continuation-in-part of Ser. No. 950,315, Sep. 24, 1992, Pat. No. 5,430,334, which is a continuation-in-part of Ser. No. 615,074, Nov. 19, 1990, Pat. No. 5,177,370.

[51] Int. Cl.⁶ .................................................. H01H 35/14
[52] U.S. Cl. ........................ 307/10.1; 307/9.1; 280/73.5; 200/61.45 R
[58] Field of Search .................................. 307/9.1, 10.1, 307/121; 200/61.45 R, 61.45 M, 61.52, 61.53; 280/735; 340/438

[56] References Cited

U.S. PATENT DOCUMENTS

| | | | |
|---|---|---|---|
| 4,103,842 | 8/1978 | Martin et al. | 200/61.52 |
| 4,281,245 | 7/1981 | Brogardh et al. | 250/227 |
| 4,484,041 | 11/1984 | Andres et al. | 200/61.45 M |
| 4,494,712 | 1/1985 | Godwin, Jr. et al. | 242/191 |
| 4,508,280 | 4/1985 | Hayash et al. | 242/191 |
| 4,609,059 | 9/1986 | Pasterkamp | 177/50 |
| 4,639,563 | 1/1987 | Günther | 200/61.45 M |
| 4,743,780 | 5/1988 | Opie | 307/149 |
| 4,827,091 | 5/1989 | Behr | 200/61.45 M |

(List continued on next page.)

FOREIGN PATENT DOCUMENTS

| | | |
|---|---|---|
| 0293784 | 12/1988 | European Pat. Off. . |
| 0589466 | 3/1994 | European Pat. Off. . |
| 3133046 | 4/1982 | Germany . |
| 3742202 | 6/1989 | Germany . |
| 3809887 | 10/1989 | Germany . |
| 9014753 | 3/1991 | Germany . |
| 4224166 | 2/1993 | Germany . |
| 4315842 | 11/1994 | Germany . |
| 2216664 | 10/1989 | United Kingdom . |
| WO8909146 | 10/1989 | WIPO . |
| 9318380 | 9/1993 | WIPO . |

OTHER PUBLICATIONS

Database WPI, Week 9232, Derwent Publications Ltd., London, GB.
Hall Effect Transducers, pp. 2, 15–27.
SAE Paper No. 920479, dated Feb. 24–28, 1992.
SAE Paper No. 920480, dated Feb. 24–28, 1992.
"Electronic Air–Bag Sensor For Further Cars", Machine Design, vol. 64, No. 21, Oct. 22, 1992, p. 86.

*Primary Examiner*—David S. Martin
*Assistant Examiner*—Peter Ganjoo
*Attorney, Agent, or Firm*—Barnes, Kisselle, Raisch, Choate, Whittemore & Hulbert

[57] ABSTRACT

A vehicle restraint system that includes an impact sensor for sensing a vehicle impact to provide an electrical impact signal, an occupant restraint such as an air bag to restrain motion of a vehicle occupant, and an electronic control circuit responsive to the impact signal for operating the occupant restraint. The impact sensor includes a permanent magnet axially slidable within a linear cavity and resiliently biased to one end of the cavity, such that vehicle impact forces on the sensor urge the magnet to slide axially toward the opposing end of the cavity against the biasing forces. A magnetic sensor is disposed adjacent to the cavity and is characterized by providing the electrical impact signal as an analog electrical signal that varies in magnitude as a continuous monotonic function of axial position of the magnet within the cavity. The electronic control circuit is responsive to the impact signal for analyzing magnitude, slope and duration of the impact signal in order to predict necessity for activating the restraint system, and activating the restraint system when the magnitude slope and duration of the impact signal meet predetermined signal conditions or criteria.

11 Claims, 5 Drawing Sheets

U.S. PATENT DOCUMENTS

| | | | |
|---|---|---|---|
| 4,857,680 | 8/1989 | Janotik | 200/61.45 R |
| 4,922,065 | 5/1990 | Behr et al. | 200/61.45 M |
| 4,933,515 | 6/1990 | Behr et al. | 200/61.45 |
| 4,965,416 | 10/1990 | Bachmann | 200/61.45 M |
| 4,975,850 | 12/1990 | Diller | 307/10.1 |
| 4,980,526 | 12/1990 | Reneau | 200/61.45 M |
| 4,982,684 | 1/1991 | Rubey | 200/61.45 M |
| 5,072,181 | 12/1991 | Burger | 324/207.25 |
| 5,149,925 | 9/1992 | Behr | 200/61.45 M |
| 5,177,370 | 1/1993 | Meister | 307/10.1 |
| 5,430,334 | 7/1995 | Meister | 307/10.1 |

VEHICLE SAFETY RESTRAINT SYSTEM WITH LINEAR OUTPUT IMPACT SENSOR

This application is a continuation-in-part of application Ser. No. 07/950,315 filed Sep. 24, 1992, now U.S. Pat. No. 5,430,334 which is a continuation-in-part of application Ser. No. 07/615,074 filed Nov. 19, 1990 and now U.S. Pat. No. 5,177,370.

The present invention is directed to vehicle safety restraint systems such as air-bag supplemental restraint systems, and more particularly to impact sensors and sensor-output analysis electronics for activating such restraint systems in the event of a vehicle impact condition.

BACKGROUND AND OBJECTS OF THE INVENTION

A number of impact sensors have heretofore been proposed for activating vehicle restraint systems. In general, such sensors are of a type that provide a digital output—i.e., an output that turns either on or off—when acceleration/deceleration forces applied to the sensor overcome inertia and biasing forces within the sensor. For example, above-noted U.S. Pat. No. 5,177,370 discloses a number of impact sensor configurations that provide a digital on/off output when impact acceleration/deceleration forces applied to the sensor exceed the sensor design threshold. In the various embodiments disclosed in such patent, the sensor on/off output signal is provided by a Wiegand wire sensor, a digital Hall-effect sensor or electromechanical switch contacts. In each embodiment, the sensor output signal is generated by a permanent magnet when movement of the magnet within a non-magnetic cavity overcomes the internal threshold of the Wiegand wire sensor or the Hall sensor, or when the magnet comes into physical contact with the electromechanical switch sensor.

Digital output sensors of the described character are particularly useful in applications in which a number of sensors are distributed around the vehicle for sensing vehicle impact at a number of locations and/or directions. However, the current trend in the automotive industry is toward so-called single-point sensors—i.e., a single sensor disposed in or near the passenger compartment of the vehicle. Such single-point sensor systems have the advantages of economy over multi-sensor systems because of the reduced sensor cost, and of experiencing the same acceleration/deceleration forces as are experienced by the vehicle occupant(s). However, because such single-point sensors are disposed at vehicle positions remote from impact sites, it is necessary that the sensor and sensor output-responsive system be able to predict a need for activating the occupant restraint system before the high impact forces are actually manifested at the passenger compartment, and sufficiently in advance that the restraint system should be activated at the appropriate time to restrain the vehicle occupants. For example, an air-bag supplemental restraint system should be activated sufficiently early that the bag becomes fully inflated as the vehicle occupant meets the bag. Thus, simply stated, it is necessary in such single-point sensor applications that the sensor and sensor output-responsive electronics be able to predict the need for activating the restraint system well in advance of application of full impact forces on the sensor, while at the same time discriminating against lesser vehicle impacts that do not require activation of the restraint system.

It has been proposed to employ conventional accelerometers, such as piezoelectric and micromachined accelerometers, in such single-point sensor vehicle restraint systems. However, manufacture of such conventional accelerometers requires application of sophisticated micromachining techniques, undesirably increasing both the cost and complexity of the sensors. Furthermore, such sensors have high frequency response, which in some cases must be electronically filtered, making the output more difficult to analyze in the necessarily short time duration required. That is, the frequency response of such sensors is much higher than that of the vehicle occupants, which can be a disadvantage in this application. This problem is illustrated, for example, in Gioutsus, "A Predictive Based Algorithm for Actuation of an Airbag," *Sensors and Actuators*, SAE (1992) and Piskie et al, "Automobile Crash Modeling and the Monte Carlo Method," *Sensors and Actuators*, SAE (1992).

It is therefore a general object of the present invention to provide a vehicle restraint system, particularly an impact sensor for a single-point vehicle restraint system, that is able to predict a need for system activation in an accurate and timely manner, while being substantially less expensive to manufacture and easier to test and service than sensors heretofore proposed. A more specific object of the present invention is to provide an impact sensor, which finds particular utility in single-point sensor vehicle restraint system applications, in which physical parameters of the sensor and choice of magnet material may be readily varied at manufacture in order to adapt or tune the sensor to the desired system application, and which employs mature technology.

SUMMARY OF THE INVENTION

A vehicle restraint system in accordance with the present invention includes an impact sensor for sensing a vehicle impact to provide an electrical impact signal, an occupant restraint such as an air bag to restrain motion of a vehicle occupant, and an electronic control circuit responsive to the impact signal for operating the occupant restraint. The impact sensor in accordance with the present invention includes a permanent magnet axially slidable within a linear cavity and resiliently biased to one end of the cavity, such that vehicle impact forces on the sensor urge the magnet to slide axially toward the opposing end of the cavity against the biasing forces. A magnetic sensor is disposed adjacent to the cavity, and is characterized by providing the electrical impact signal as an analog electrical signal that varies in magnitude as a continuous monotonic function of axial position of the magnet within the cavity. The electronic control circuit is responsive to the impact signal for analyzing magnitude, slope and duration of the impact signal in order to predict necessity for activating the restraint system, and activating the restraint system when the magnitude, slope and duration of the impact signal meet predetermined signal conditions or criteria.

In various embodiments of the invention, biasing forces are applied to the sensor magnet by a second magnet, by a ferromagnetic plate, or by a coil spring disposed within the cavity in engagement with the magnet. Where two magnets are employed, the poles of the magnets may be oriented in either an attraction or a repulsion configuration. Where a ferromagnetic plate is employed, the plate may bias the magnet either toward or away from the magnetic sensor. In the preferred embodiments of the invention, the sensor is disposed in axial alignment with the magnet, with the magnet being biased either toward or away from the sensor. The magnetic sensor in the preferred embodiments of the invention may comprise either a linear Hall-effect sensor that outputs a voltage or current dependent upon magnetic field strength, or a magnetoresistive sensor that exhibits electrical resistance properties that vary as a function of magnetic field strength.

The restraint system and impact sensor so provided exhibit a number of advantages over the prior art. For example, the sensor may be manufactured employing conventional manufacturing techniques using normal manufacturing tolerances, as distinguished from micromachining techniques, at a cost of one-third (or less) than the cost of micromachined accelerometers. The physical parameters of the sensor and magnetic material may be selected and controlled during design and manufacture to yield a desired electrical output characteristic, thereby greatly simplifying the cost and complexity of the sensor-responsive electronics by eliminating the need for elaborate filtration techniques, for example. The sensor parameters that may be selectively controlled during design and manufacture include magnet weight and material, biasing forces on the magnet affecting both inertia and responsiveness of the sensor, magnetic force and strength, and distance between the magnet and both the biasing element and magnetic sensor.

The sensor of the present invention is also characterized by possessing a relatively low frequency response characteristic, as compared with the high frequency response characteristic of micromachined accelerometers. Such lower frequency response characteristic eliminates in some applications the need for signal filtration as described above, and also reduces sensor sensitivity to a level appropriate for vehicle restraint system applications. Simply stated, the impact sensor of the present invention may be specifically designed and tailored during manufacture as desired by the vehicle designer for use in conjunction with a particular vehicle body style having certain predetermined impact characteristics. Frequency response can be increased, where desired, through use of a magnetic material having a higher strength/weight ratio, such as samarium cobalt.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
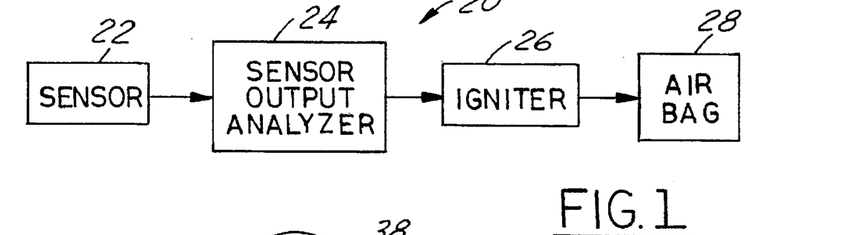
FIG. 1 is a functional block diagram of a single-point vehicle supplemental restraint system in accordance with a presently preferred embodiment of the invention.

FIG. 1 illustrates a single-point vehicle supplemental restraint system 20 in which an impact sensor 22 provides an output signal to sensor output analyzer electronics 24 indicative of rapid deceleration of the vehicle caused by impact from one or more directions. Electronics 24 provides a signal to an igniter 26, which in turn initiates a chemical reaction for rapidly inflating the vehicle supplemental restraint air-bag 28. Sensor 22 is disposed within or adjacent to the vehicle passenger compartment, and thereby is subjected to the same deceleration forces as are imparted to the vehicle occupant(s). Sensor output analyzer electronics 24 is responsive to slope, magnitude and duration of the sensor output signal to predict whether or not the impact is of sufficient magnitude to initiate operation of the air-bag, and to time deployment of the air-bag so that the air-bag will reach full deployment at or slightly before the instant of contact by the vehicle occupant(s).

Figure 2:
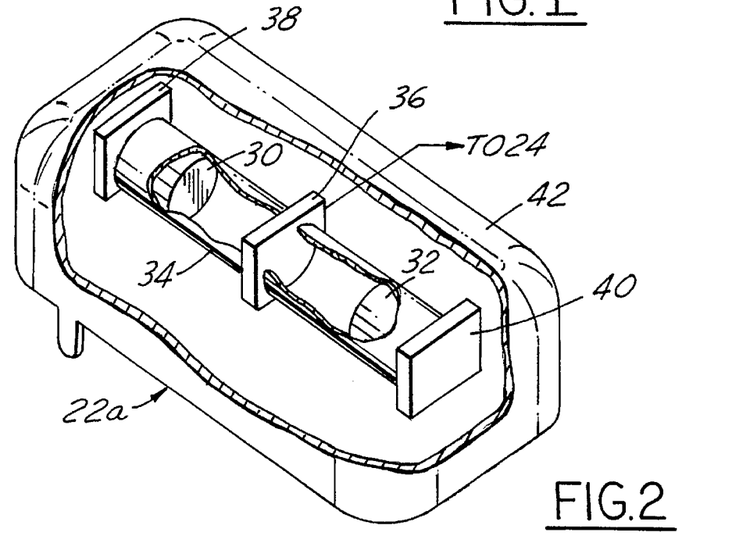
FIG. 2 is a fragmentary perspective view of an single-point impact sensor in accordance with one embodiment of the invention.

FIG. 2 illustrates an impact sensor 22a in accordance with one presently preferred embodiment of the invention. A pair of cylindrical permanent magnets 30,32 are disposed at opposite ends of a hollow cylindrical sleeve 34 of plastic, brass or other non-magnetic construction. Magnets 30,32 have axially oriented poles, and are disposed within sleeve 34 so that like poles are opposed, so that magnetic forces of magnets 30,32 on each other resiliently urge or bias the respective magnets to opposite ends of sleeve 34. One of the magnets 30 preferably is secured within sleeve 34, while the other magnet 32 is freely axially slidable within sleeve 34. Sensor 22a is thus a unidirectional sensor. Alternately, but less preferably, both magnets 30,32 may be freely slidably disposed within sleeve 34, sensor 22a thus being a bidirectional sensor.

A linear output Hall-effect sensor 36 is disposed within sleeve 34 at an orientation that intersects and is orthogonal to the common axis of sleeve 34 and magnets 30,32. As employed herein, the term "linear output" Hall sensor is intended to refer to a Hall-effect sensor that provides an output signal that is an analog electrical signal that varies in magnitude as a continuous monotonic function of magnetic field strength, as distinguished from a digital output Hall-effect sensor that provides an output that switches between two digital states (with or without hysteresis) as a function of magnetic field strength. The sensor transfer function preferably is a substantially linear function of field strength, although non-linear monotonic functions, such as exponential or parabolic functions, are also within the scope of the present invention. Magnetoresistive sensors, which provide an electrical resistance that varies as a substantial monotonic function of magnetic field strength, are also contemplated and within the scope of the present invention, although Hall effect-type sensors are presently preferred. A pair of stop plates 38,40 close the opposed ends of tube 34. In the embodiment of FIG. 2, end plates 38,40 preferably are of non-ferrous construction.

In operation, sensor 36 thus provides to sensor output analysis electronics 24 an electrical signal that varies substantially linearly with field strength, and thus substantially linearly with position of magnet 32. Magnet 32 is resiliently urged or biased against end plate stop 40 by the forces of mutual magnetic repulsion relative to magnet 30. When sensor 22a experiences sudden acceleration or deceleration of which a component in the direction of the magnet axis overcomes such magnetic biasing forces and urges magnet 32 toward sensor 6, sensor 36 provides a corresponding output signal as a function of position of magnet 32 within sleeve 34. The slope, magnitude and duration of such signal are analyzed at electronics 4 to predict whether or not the sensor output signal indicates an impact of severity sufficient to warrant air bag deployment, and to predict the appropriate time for such deployment. FIGS. 3A–6B illustrate such operation.

Each pair of figures FIGS. 3A, 3B, FIGS. 4A, 4B, FIGS. 5A, 5B and FIGS. 6A, 6B illustrate acceleration/deceleration forces imparted to sensor 22a (FIG. 2), and the corresponding electrical output signal supplied by sensor 36. In developing these graphic illustrations, a sensor 22a was constructed using a ¼ inch diameter by 5/16 inch long magnet, with a total travel from home position to peak reading of ¼ inch. The sensor so constructed was mounted on a so-called "drop table," which is a standard device for testing output of accelerometers marketed by AVEX, type SM110, model MP. A precision accelerometer is carried by the drop table to provide an output signal that illustrates actual acceleration/deceleration imparted to the sensor by the test device. These accelerometer output signals are illustrated in FIGS. 3A, 4A, 5A and 6A. The output developed by impact sensor 22a, and in particular by Hall sensor 36, is illustrated in corresponding FIGS. 3B, 4B, 5B and 6B. All of these figures have abscissas in identical units of time, and ordinates in identical units of volts.

Figure 3A:
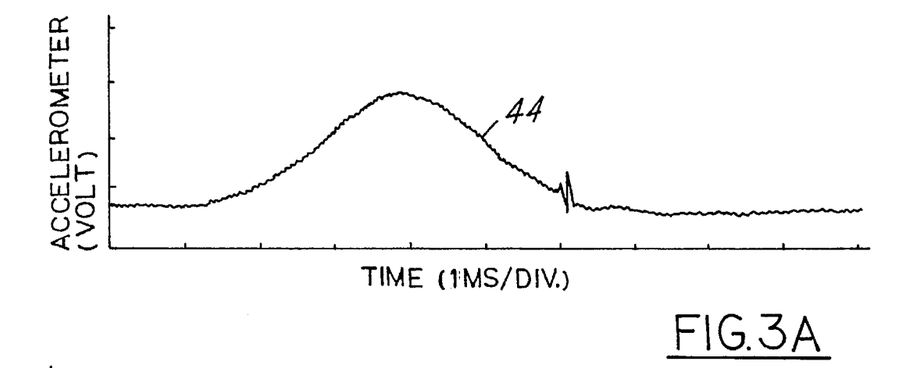
FIGS. 3A, 3B, 4A, 4B, 5A, 5B, 6A and 6B are graphs that illustrate operation of the embodiment of the invention shown in FIG. 2.
Figure 4A:
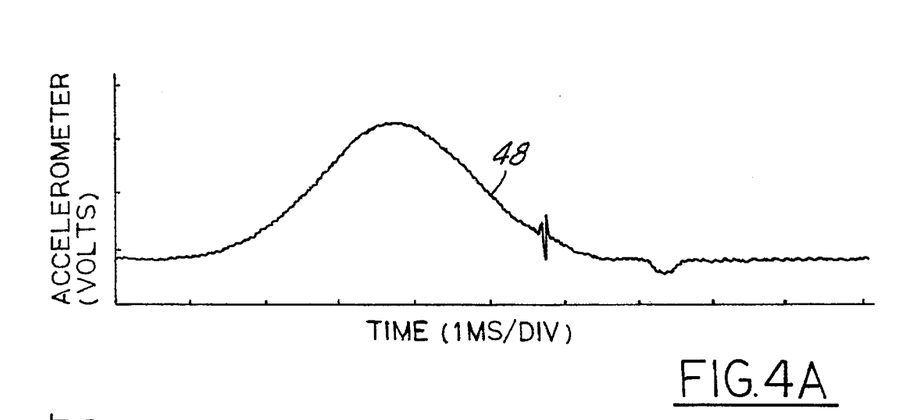
Figure 4B:
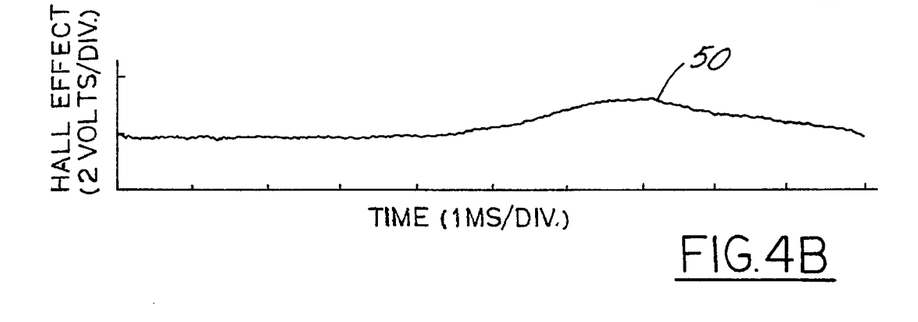
Figure 5A:
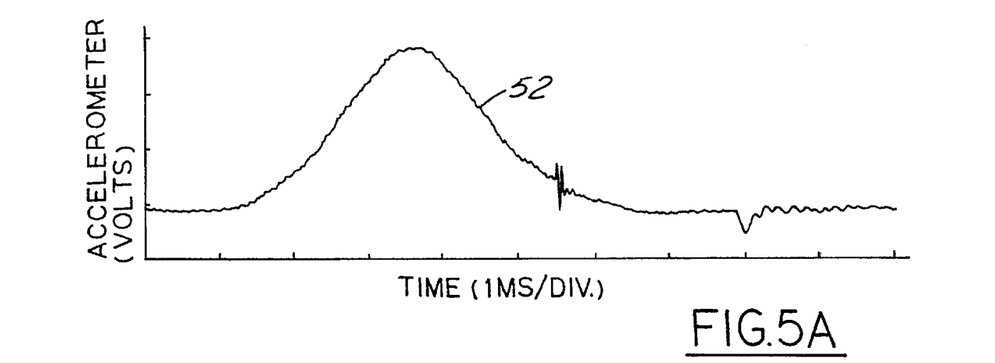
Figure 5B:
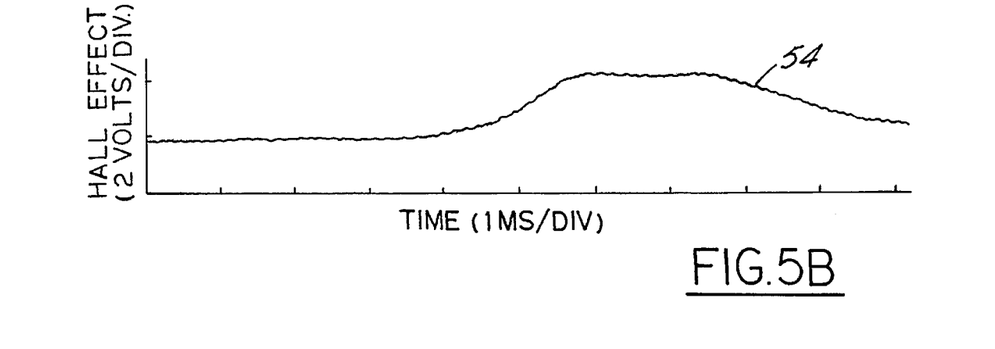
Figure 6A:
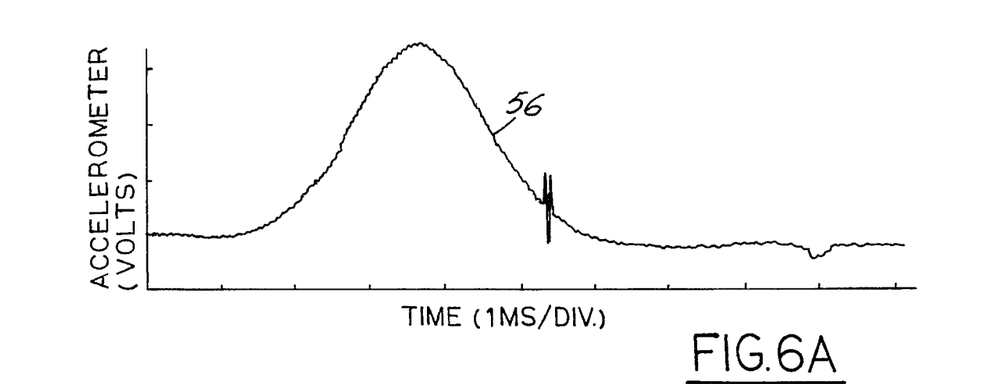
Figure 6B:
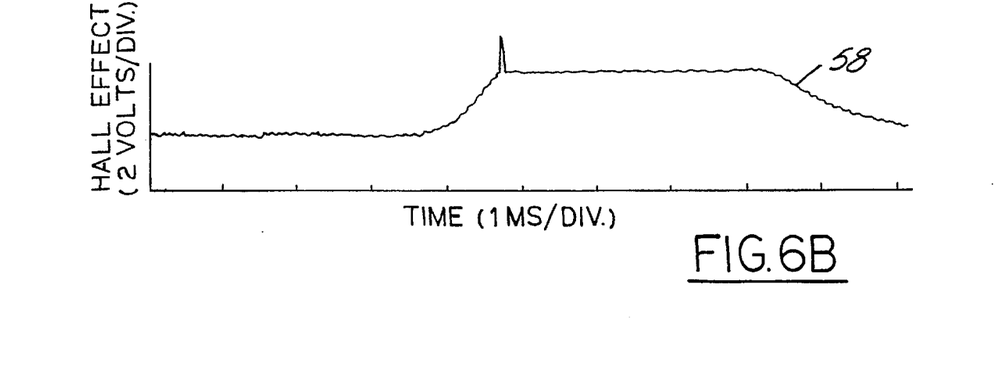

Referring to FIG. 3A, the waveform 44 indicates that the sensor was subjected to an acceleration of approximately 21 g, while sensor 36 provided a constant output 46, which is to say that the acceleration illustrated at 44 in FIG. 3A resulted in no change in output 46 from sensor 36. In FIG. 4A, the waveform 48 illustrates an acceleration imparted to the impact sensor of approximately 25 g, which resulted in a change 50 of Hall-effect sensor output of approximately 1.4 volts. Note that the Hall sensor output 50 lags input acceleration 48 by a substantial time period, with the Hall sensor output beginning to increase only when acceleration 48 reaches peak amplitude. The peak of Hall sensor output 50 is delayed substantially 3.5 milliseconds as compared with the peak of acceleration input 48. FIG. 5A illustrates an acceleration input 52 of approximately 29 g, and the corresponding output 54 from the Hall sensor. Once again, sensor output 54 begins to increase only when input acceleration 52 reaches peak amplitude. In FIG. 6A, input acceleration 56 reaches about 36 g.

In each of FIGS. 3A, 4A, 5A and 6A, maximum input acceleration was reached in approximately 3.5 milliseconds, meaning that both the rate of change and maximum input acceleration increased between each successive FIGS. 3A, 4A, 5A and 6A. Likewise, the corresponding Hall sensor response varied in each successive FIG. 3B, 4B, 5B and 6B. In each figure, the Hall sensor output begins to increase at approximately the time of peak acceleration input. However, there is a progressively decreasing delay between the peak acceleration input and the peak sensor output signal from FIG. 4B to FIG. 6B. As noted above, this delay is approximately 3.5 milliseconds in FIG. 4B, but decreases to 2.5 milliseconds in FIG. 5B and further to 1.0 milliseconds in FIG. 6B.

In each of FIGS. 3B, 4B, 5B and 6B, the voltage output responds to the acceleration input with a time lag. The magnitude and the time delay of the voltage output reflect the strength of the acceleration. The greater the accelerations, the smaller the time delay in the voltage output. This feature can be utilized to discriminate impact severity, as well as to provide a timely trigger signal.

Figure 3B:
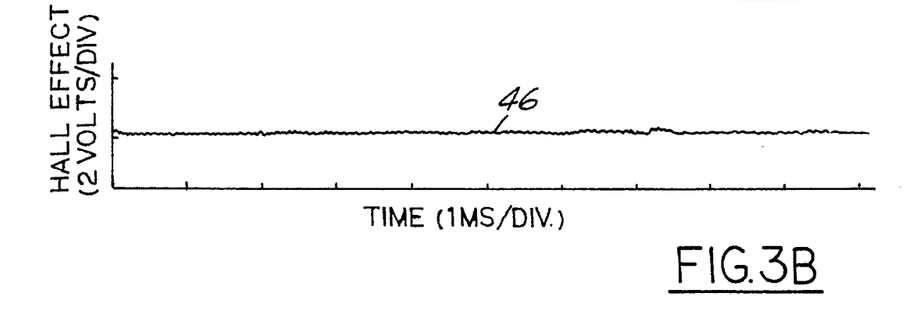

One application can use a sensing criteria described below. The crash sensor is triggered when the voltage value reaches a preselected threshold for example, assume selection of an output of 3 volts as the trigger threshold in FIG. 3–6. In FIG. 3B, the voltage output does not reach the threshold and the sensor will be not be triggered. As the acceleration (impact) magnitude is increased in FIGS. 4B, 5B and 6B, the voltage output reaches the threshold with the triggering time moving earlier accordingly. This is similar to the general requirements of an airbag restraint system, in which the triggering time should be reduced when the magnitude of the impact increases.

Furthermore, the rise rate (slope) of the voltage output also indicates the magnitude of the acceleration input. Therefore, when sensor output analyzer 26 (FIG. 1) is responsive to both input signal magnitude and slope, the slope information can be coupled with the voltage output to provide a better sensing criteria. For example, one algorithm may set threshold values for both the voltage and the slope as the triggering criteria of the crash sensor. Another possible algorithm would use a multiple of the voltage and the slope as the triggering criteria. The determination of an optimal criterion depends on an evaluation of the system requirements, the sensor location and the subject vehicle. The linear analog output of this invention provides a means of utilizing the slope information in addition to the switching function of a threshold voltage.

The graphic illustrations of FIGS. 3A–6B thus illustrate an important feature of the present invention in that sensor 22a may be readily constructed employing known and inexpensive manufacturing techniques, but at the same time may be specifically tailored at the time of design and manufacture to provide a desired output characteristic. That is, parameters such as magnet size, magnet strength and magnet separation may be selected to provide a desired acceleration/deceleration response characteristic. Furthermore, these design parameters may be selected and varied employing conventional computer modeling techniques to obtain the desired output, with the final set of design parameters being confirmed in the laboratory. The time between design and ultimate manufacture may thus be greatly reduced. Sensor 22a may be constructed at a cost of one-third or less of the costs of comparable accelerometers employing piezoelectro micromachining technology and the like.

Figure 7:
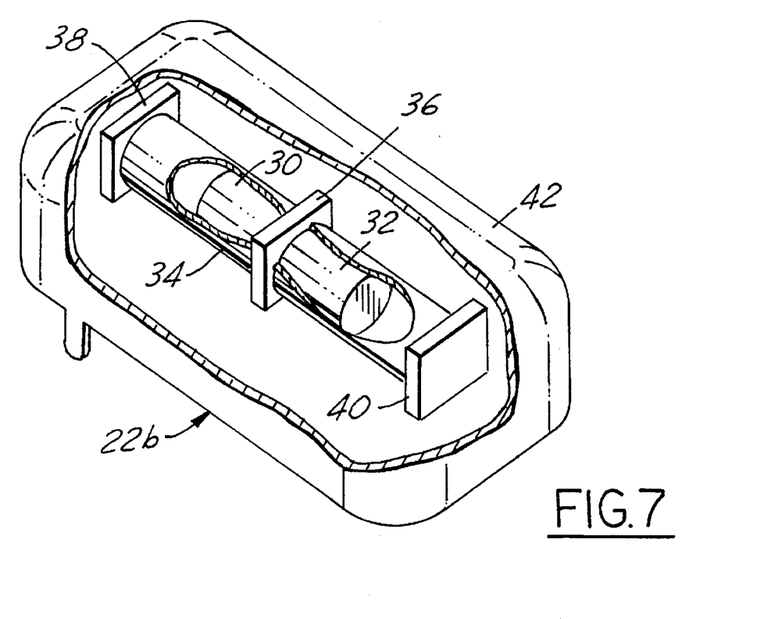
FIG. 7 is a fragmentary perspective view of a single-point impact sensor in accordance with a modified embodiment of the invention.
Figure 8:
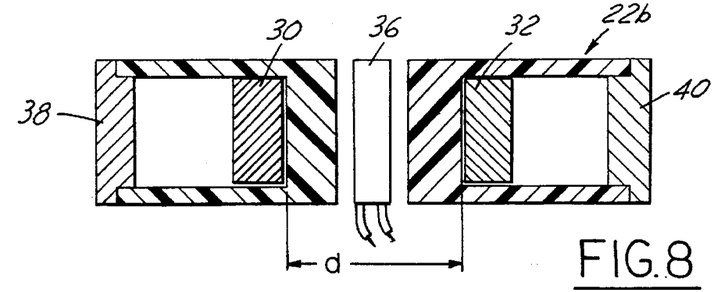
FIG. 8 is a schematic diagram of the impact sensor illustrated in FIG. 7.

FIGS. 7 and 8 illustrate an impact sensor 22b in accordance with a modified embodiment of the invention, in which permanent magnets 30,32 are this time disposed within non-magnetic sleeve 34 so as to have opposite poles axially facing each other, such that magnets 30,32 resiliently attract to each other toward Hall sensor 36. The advantage of the embodiment of FIGS. 7 and 8 lies in the ability closely to control separation d (FIG. 8) between magnets 30,32, and thus the ability more closely and precisely to control the biasing attraction force of the magnets on each other.

Figure 9:
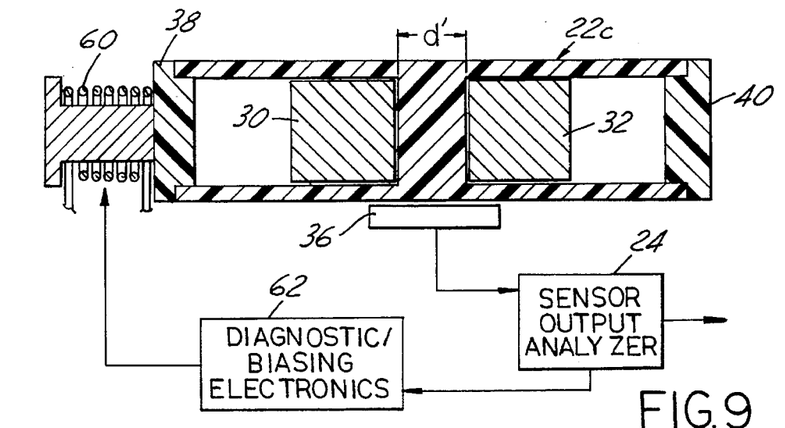
FIG. 9 is a schematic diagram of an impact sensor and associated electronics in accordance with a further embodiment of the invention.

FIG. 9 illustrates a modified sensor construction 22c, in which sensor 36 is disposed tangentially of the common axis of magnets 30,32. Such construction provides the ability to have an even smaller separation d' between magnets 30,32. FIG. 9 also illustrates an electrical coil 60 axially aligned with magnets 30,32 and disposed adjacent to magnet 30 for providing the ability to adjust the biasing magnetic field applied to the magnets, and also to test operation of the sensor for diagnostic purposes upon initial start-up of the vehicle engine, for example.

Figure 10:
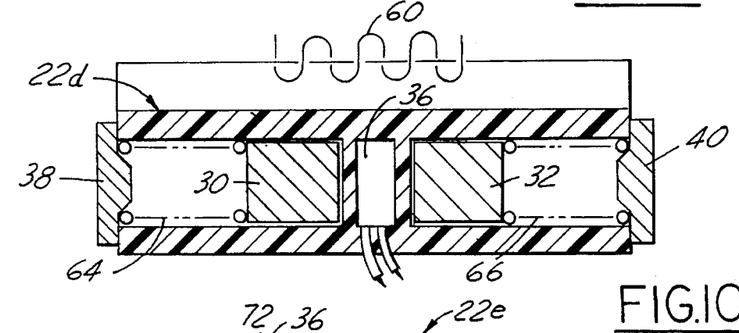
FIGS. 10, 11, 12, 13, 14 and 15 are schematic diagrams of respective modified impact sensor constructions in accordance with respective additional embodiments of the invention.

FIG. 10 illustrates a further modification in which coil springs 64,66 are disposed in compression between magnets 30,32 and correspondingly adjacent end caps 38,40. Thus, the biasing forces on the magnets in this embodiment comprise both magnetic and spring forces, further enhancing selective adjustability of such forces and corresponding sensor output characteristics in accordance with the invention.

Figure 11:
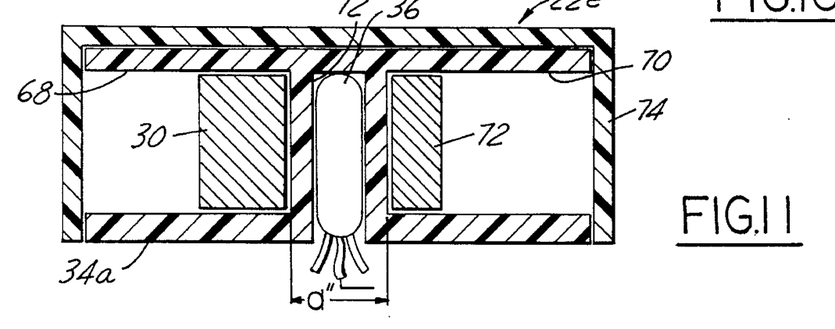

FIG. 11 illustrates a sensor 22e in which a plastic sleeve 34a has opposed axially outwardly facing pockets 68,70. A ferromagnetic plate 72 of ferromagnetic material is secured at the base of pocket 70, and cylindrical magnet 30 is slidably disposed within the opposing pocket 68. Hall sensor 36 is disposed within a laterally opening pocket 72 between pockets 68,70, and thus between plate 72 and magnet 30. A cover 74 is received over sleeve 34a to close pockets 68,70. In this embodiment, the threshold and response characteristics of sensor 22e are controlled by the axial dimension d" between magnet 30 and biasing plate 72, the strength and weight of the magnet, and the size of biasing plate 72. Output pulse polarity can, of course, be reversed by reversing polarity of the magnet. Thus, sensors placed on opposed sides of the vehicle can more precisely determine desired time of deployment of the restraint system.

Figure 12:
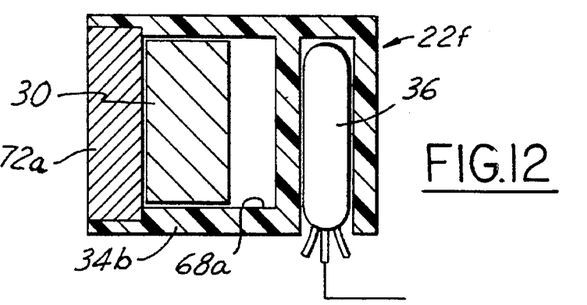

FIG. 12 illustrates a sensor 22f having magnet 30 disposed within cavity 68a of a sleeve construction 34b, with the cavity being closed by a ferromagnetic biasing plate 72a. Thus, in this embodiment, magnet 30 is attracted to plate 72a and normally spaced from sensor 36. Magnet 30 is moved toward sensor 36 in response to deceleration forces that overcome the force of magnetic attraction between magnet 30 in plate 72a. As in the case with sensor 22e in FIG. 11, response characteristics of sensor 22f can be varied by varying material, strength and weight of magnet 30, material and size of plate 72a, separation between magnet 30 and sensor 36, and separation if any between magnet 30 and plate 72a.

Figure 13:
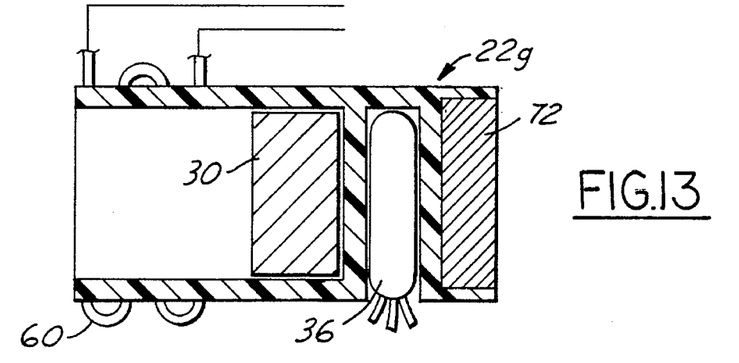

FIG. 13 illustrates a sensor 22g that is similar to sensor 22e of FIG. 11, with the addition of diagnostic and biasing coil 60 as in FIG. 9.

Figure 14:
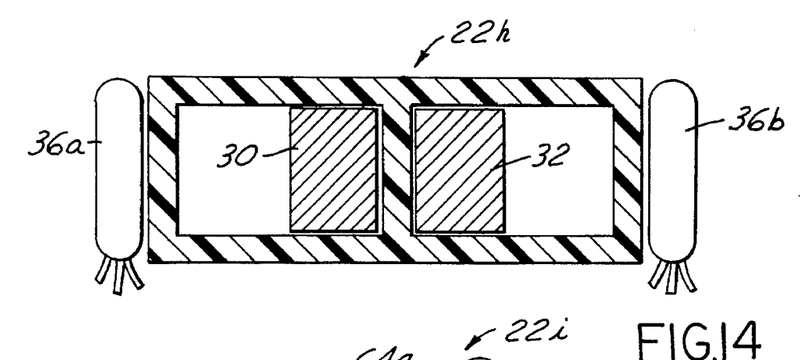
Figure 15:
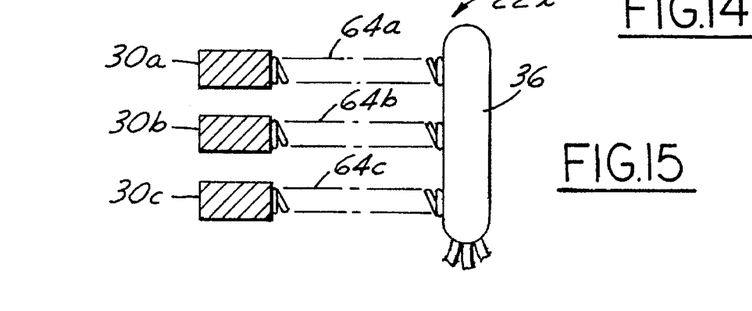

FIG. 14 illustrates a bidirectional sensor 22h having magnets 30,32 poled to attract each other, and a pair of linear Hall sensors 36a,36b at axially opposed ends of the sensor. FIG. 15 illustrates a sensor 22i having multiple magnets 30a,30b,30c biased by associated springs 64a,64b,64c with respect to a single Hall sensor 36. Springs 64a,64b,64c have characteristics such that the magnets move in succession in response to increasing acceleration. This feature extends the total range of the sensor.

There has thus been disclosed a number of impact sensor constructions that satisfy the objectives and aims previously set forth. In each sensor assembly, a number of parameters can be varied to select and tailor the output characteristics of the sensor, including overall length and distance between the magnets and sensors, location and orientation of the sensing device, magnet strength, magnet mass, the use of ferrous biasing plate(s), distance from the biasing plate(s), (if any) to the magnet(s), mechanical stops to limit magnet travel, and the use of magnets and/or springs for tailoring the biasing force on the sensing magnet. The sensing element, which preferably is a Hall sensor but may be a magnetoresistive or other linear output sensor, provides an analog output signal that varies as a function of sensor magnet position, which is analyzed to predict need for and timing of air bag deployment.

I claim:

1. In a vehicle restraint system that includes an impact sensor having means for sensing a vehicle impact to provide an impact signal, restraint means for positioning in a vehicle to restrain motion of a vehicle occupant upon operation of said restraint means, and means responsive to said impact signal for operating said restraint means, the improvement:

wherein said impact sensor comprises means having a linear internal cavity with axially opposed ends, a permanent magnet axially slidably disposed in said cavity, means resiliently biasing said magnet to one end of said cavity such that vehicle impact forces on said sensor urge said magnet to slide axially toward the opposing end of said cavity against force applied to said magnet by said biasing means, and magnetic sensing means disposed adjacent to said cavity and being characterized by providing said impact signal as an analog electrical signal that varies in magnitude as a continuous monotonic function of axial position of said magnet within said cavity, and wherein said means responsive to said impact signal comprises means for analyzing magnitude, slope and duration of said impact signal to operate said restraint means when said magnitude, slope and duration of said impact signal meet predetermined signal conditions.

2. The system set forth in claim 1 wherein said biasing means comprises a second permanent magnet, said magnets having like poles axially opposed to each other.

3. The system set forth in claim 1 wherein said biasing means comprises a second permanent magnet, said magnets having opposite poles opposed to each other.

4. The system set forth in claim 2 or 3 wherein said sensing means is disposed axially between said magnets.

5. The system set forth in claim 1 wherein said biasing means comprises means of ferromagnetic construction axially aligned with said magnet and attracting said magnet toward said one end of said cavity.

6. The system set forth in claim 5 wherein said sensing means is disposed axially between said magnet and ferromagnetic means.

7. The system set forth in claim 5 wherein said sensing means is disposed in axial alignment with said ferromagnetic means and said magnet, said magnet being disposed between said ferromagnetic means and said sensing means.

8. The system set forth in claim 1 wherein said biasing means comprises a coil spring disposed in said cavity in engagement with said magnet.

9. The system set forth in claim 1, 2 or 3 wherein magnetic sensing means is selected from the group consisting of linear output Hall sensors, and magnetoresistive sensors that exhibit electrical resistance properties that vary as a function of magnetic field strength.

10. The system set forth in claim 1 wherein said means having a linear internal cavity comprises a body of non-magnetic construction in which said cavity comprises an axial first pocket in said body having an open end at one end of said body and a closed end within said body, said body further having a second pocket axially adjacent to said closed end of said first pocket and opening laterally of said body in which said sensing means is disposed.

11. A single-point sensor vehicle restraint system that comprises:

restraint means for positioning in a vehicle passenger compartment to restrain motion of a vehicle occupant upon activation of said restraint means, a single-point impact sensor for positioning within or adjacent to the vehicle passenger compartment, said sensor comprising a non-magnetic body having a linear internal cavity with axially opposed ends, a permanent magnet axially slidably disposed in said cavity, means resiliently biasing said magnet to one end of said cavity such that vehicle impact forces on said sensor urge said magnet to slide axially toward the opposing end of said cavity against force applied to said magnet by said biasing means, and a Hall-effect sensor disposed adjacent to said cavity for providing an electrical impact signal as a function of motion of said magnet within said cavity, and means responsive to said impact signal for activating said restraint means.

\* \* \* \* \*